(12) United States Patent
Kline

(10) Patent No.: US 6,226,872 B1
(45) Date of Patent: May 8, 2001

(54) SNIPPER TOOL DEVICE FOR SNIPPING J-CHANNEL

(76) Inventor: Keith Kline, 16453 Sharp Rd., Rockton, IL (US) 61072

( * ) Notice: Subject to any disclaimer, the term of this patent is extended or adjusted under 35 U.S.C. 154(b) by 0 days.

(21) Appl. No.: 09/491,575

(22) Filed: Jan. 25, 2000

Related U.S. Application Data

(63) Continuation-in-part of application No. 08/954,195, filed on Oct. 20, 1997, which is a continuation-in-part of application No. 08/556,500, filed on Nov. 13, 1995, now Pat. No. 5,678,367.
(60) Provisional application No. 60/117,111, filed on Jan. 25, 1999.

(51) Int. Cl.[7] ...................................................... B26B 13/22
(52) U.S. Cl. .............................................. 30/134; 30/145
(58) Field of Search ............................ 30/134, 135, 142, 30/131, 145, 254; 7/134–136

(56) References Cited

U.S. PATENT DOCUMENTS

| | | | | |
|---|---|---|---|---|
| 1,759,553 | * | 5/1930 | Henault ................................. | 7/135 X |
| 3,168,119 | * | 2/1965 | Schwester et al. ...................... | 30/134 |
| 4,610,086 | * | 9/1986 | Mastroianni ............................ | 30/135 |
| 6,131,223 | * | 10/2000 | Rehkeper et al. ..................... | 7/135 X |

* cited by examiner

Primary Examiner—Douglas D. Watts
(74) Attorney, Agent, or Firm—David J. Archer

(57) ABSTRACT

A snipper tool device is disclosed for snipping J-channel. The device includes a first member having a first and a second end and a second member having a first and a second extremity. The first and second members are pivotally secured to each other about a first axis which is disposed between the ends of the first member and between the extremities of the second member. The first end of the first member defines a shearing edge and the first extremity of the second member defines a cutting edge, the shearing and cutting edges cooperating together for snipping the J-channel. Also, the second end of the first member defines a hand grip and the second extremity of the second member defines a finger grip, the hand grip and the finger grip being arranged such that when the hand grip and the finger grip move towards each other, the shearing edge and the cutting edge move towards each other for snipping the J-channel. A cutting blade is rigidly secured to the first member between the first axis and the hand grip and a cutting knife is rigidly secured to the second member between the first axis and the finger grip, the cutting blade and the cutting knife moving towards each other when the hand grip and the finger grip move towards each other such that the cutting blade and the cutting knife perform a cutting operation on the J-channel when the J-channel is disposed between the members between the first axis and the grips. Additionally, the device includes a first arm having a proximal and a distal end, the proximal end being pivotally secured to the first member about a second axis disposed between the first axis and the grips. The second arm has an inner and an outer end, the inner end being pivotally secured to the second member about a third axis which is disposed between the first axis and the grips, the axes being disposed parallel relative to each other. The distal end of the first arm defines a first hook for internally engaging the J-channel and the outer end of the second arm defines a second hook for internally engaging the J-channel. The arrangement is such that when the J-channel is located between the members and between the first axis and the grips, the hooks engage the J-channel for supporting the same and for urging the J-channel towards the cutting blade and the cutting knife for performing the cutting operation on the J-channel when the grips are urged towards each other.

9 Claims, 3 Drawing Sheets

SNIPPER TOOL DEVICE FOR SNIPPING J-CHANNEL

CROSS REFERENCE TO RELATED APPLICATION

The present invention is a continuation-in-part of copending provisional application U.S. Ser. No. 60/117,111 filed Jan. 25, 1999 which is a continuation-in-part of copending application U.S. Ser. No. 08/954,195 filed Oct. 20, 1997 which is a continuation- in- part of U.S. Ser. No. 08/556,500 filed Nov. 13, 1995 which issued as U.S. Pat. No. 5,678,367 on Oct. 21, 1997. All the subject matter of the aforementioned applications are incorporated herein by reference.

BACKGROUND OF THE INVENTION

FIELD OF THE INVENTION

The present invention relates to a snipper tool device for snipping J-channel. More specifically, the present invention relates to a snipper tool device for snipping J-channel used for fastening housing siding.

INFORMATION DISCLOSURE STATEMENT

Vinyl siding enables the transformation of a building to present an aesthetic appearance thereto and to protect the building against the elements.

However, although the application of vinyl siding to an unobstructed external wall of a building is relatively straight forward, the application of such siding around windows and doors and the like have proved to be labor intensive thereby increasing the overall cost of the siding operation.

The present invention drastically reduces the time taken to install J-channels around an opening such as a window or the like.

Also, according to the present invention, the co-operating J-channels when provided with a V-shaped cut are secured around an opening such as a window to present a particularly pleasing appearance when the siding has been locked therein.

Therefore it is a primary feature of the present invention to provide a snipper tool device for assisting in cutting J-channel for fastening siding around an opening defined by a building and for enabling an operator to secure such siding in considerably less time than permitted by the prior art arrangements.

Another feature of the present invention is the provision of a snipper tool device for facilitating the installation of J-channels having an improved aesthetic appearance.

Another feature of the present invention is the provision of a snipper tool device for cutting a J-channel used for fastening siding around an opening defined by a building.

Other features and advantages of the present invention will be readily apparent to those skilled in the art by a consideration of the detailed description contained hereinafter taken in conjunction with the annexed drawings.

SUMMARY OF THE INVENTION

The present invention relates to a snipper tool device for snipping J-channel. The device includes a first member having a first and a second end and a second member having a first and a second extremity. The first and second members are pivotally secured to each other about a first axis which is disposed between the ends of the first member and between the extremities of the second member. The first end of the first member defines a shearing edge and the first extremity of the second member defines a cutting edge, the shearing and cutting edges cooperating together for snipping the J-channel. Also, the second end of the first member defines a hand grip and the second extremity of the second member defines a finger grip, the hand grip and the finger grip being arranged such that when the hand grip and the finger grip move towards each other, the shearing edge and the cutting edge move towards each other for snipping the J-channel. A cutting blade is rigidly secured to the first member between the first axis and the hand grip and a cutting knife is rigidly secured to the second member between the first axis and the finger grip, the cutting blade and the cutting knife moving towards each other when the hand grip and the finger grip move towards each other such that the cutting blade and the cutting knife perform a cutting operation on the J-channel when the J-channel is disposed between the members between the first axis and the grips.

Additionally, the device includes a first arm having a proximal and a distal end, the proximal end being pivotally secured to the first member about a second axis disposed between the first axis and the grips. The second an has an inner and an outer end, the inner end being pivotally secured to the second member about a third axis which is disposed between the first axis and the grips, the axes being disposed parallel relative to each other. The distal end of the first arm defines a first hook for internally engaging the J-channel and the outer end of the second arm defines a second hook for internally engaging the J-channel. The arrangement is such that when the J-channel is located between the members and between the first axis and the grips, the hooks engage the J-channel for supporting the same and for urging the J-channel towards the cutting blade and the cutting knife for perform the cutting operation on the J-channel when the grips are urged towards each other.

Many modifications and variations of the present invention will be readily apparent to those skilled in the art by a consideration of the detailed description contained hereinafter taken in conjunction with the annexed drawings. However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figure 1:
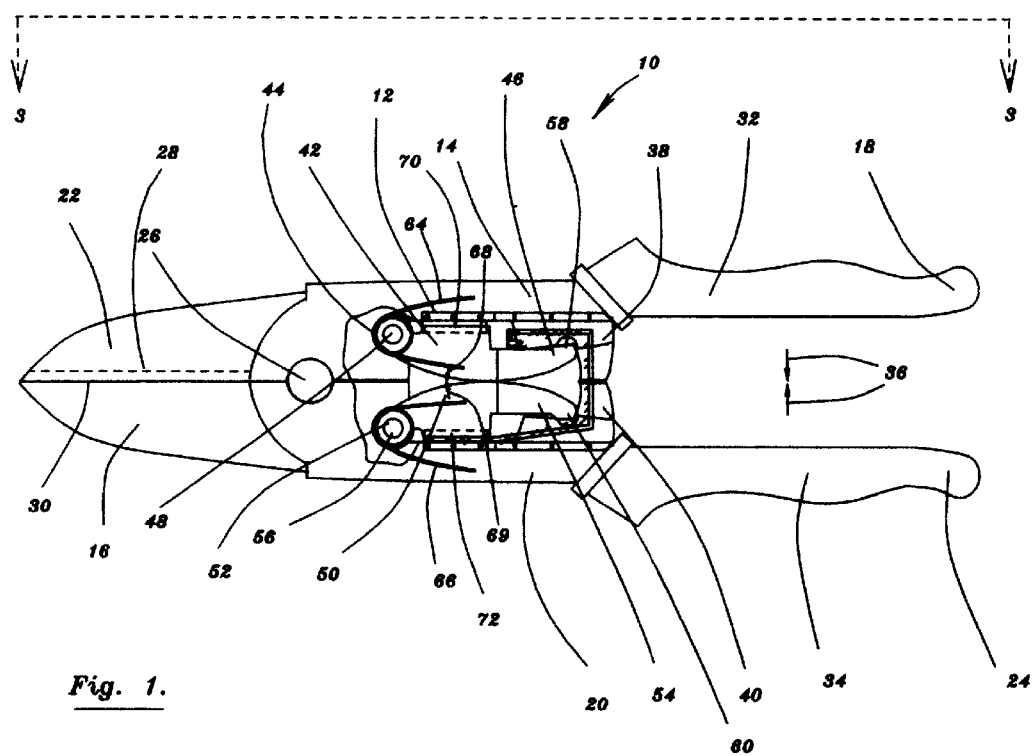
FIG. 1 is a side elevational view of a snipper tool according to the present invention.

FIG. 1 is a side elevational view of a snipper tool device generally designated 10 according to the present invention.

As shown in FIG. 1 the tool 10 is used for snipping J-channel 12. The device 10 includes a first member 14 having a first and a second end 16 and 18 respectively and a second member 20 having a first and a second extremity 22 and 24 respectively. The first and second members 14 and 20 are pivotally secured to each other about a first axis 26 which is disposed between the ends 16 and 18 of the first member 14 and between the extremities 22 and 24 of the second member 20. The first end 16 of the first member 14 defines a shearing edge 28, shown in phantom outline, and the first extremity 22 of the second member defines a cutting edge 30. The shearing and cutting edges 28 and 30 cooperate together for snipping the J-channel 12. Also, the second end 18 of the first member 14 defines a hand grip 32 and the second extremity 24 of the second member 20 defines a finger grip 34. The hand grip 32 and the finger grip 34 are arranged such that when the hand grip 32 and the finger grip 34 move towards each other as shown by the arrows 36, the shearing edge 28 and the cutting edge 30 move towards each other for snipping the J-channel 12 when the J-channel is located between the shearing edge 28 and the cutting edge 30.

Additionally, a cutting blade 38 is rigidly secured to the first member 14 between the first axis 26 and the hand grip 32 and a cutting knife 40 is rigidly secured to the second member 20 between the first axis 26 and the finger grip 34, the cutting blade 38 and the cutting knife 40 moving towards each other when the hand grip 32 and the finger grip 34 move towards each other as shown by arrow 36. The arrangement is such that the cutting blade 38 and the cutting knife 40 perform a cutting operation on the J-channel 12 when the J-channel 12 is disposed between the members 14 and 20 between the first axis 26 and the grips 32 and 34 as shown in FIG. 1.

Also, the device 10 includes a first arm 42 having a proximal and a distal end 44 and 46 respectively, the proximal end 44 being pivotally secured to the first member 14 about a second axis IZ0 48 disposed between the first axis 26 and the grip 32. A second arm 50 has an inner and an outer end 52 and 54 respectively, the inner end 52 being pivotally secured to the second member 20 about a third axis 56 which is disposed between the first axis 26 and the grip 34. The axes 26, 48 and 56 are disposed parallel relative to each other. The distal end 46 of the first arm 42 defines a first hook 58 for internally engaging the J-channel 12 and the outer end 54 of the second arm 50 defines a second hook 60 for internally engaging the J-channel 12. The arrangement is such that when the J-channel 12 is located between the members 14 and 20 respectively and between the first axis 26 and the grips 32 and 34 respectively, as shown in FIG. 1, the hooks 58 and 60 internally engage the J-channel 12 for supporting the same and for urging the J-channel 12 towards the cutting blade 38 and the cutting knife 40 for performing the cutting operation on the J-channel 12 when the grips 32 and 34 respectively are urged towards each other as shown by the arrows 36.

The arms 42 and 50 have return springs 64 and 66 respectively for urging the arms towards each other as indicated by the arrows 68 and 69 respectively.

Also, as shown in FIG. 1, the arms 42 and 50 have anvils 70 and 72 for cooperating with respective cutting blades anchored to the members 14 and 20 respectively so that when the members 14 and 20 move towards each other, a longer portion of the J-channel is cut by an interaction of the cutting blade and the corresponding anvil 72 as shown in FIG. 1. The cutting blades are preferably manufactured as a one piece unit with blades and knife 38 and 40 so that when for example the blade 38 needs to be replaced, the cutting blade for the anvil 70 is changed at the same time.

Figure 3:
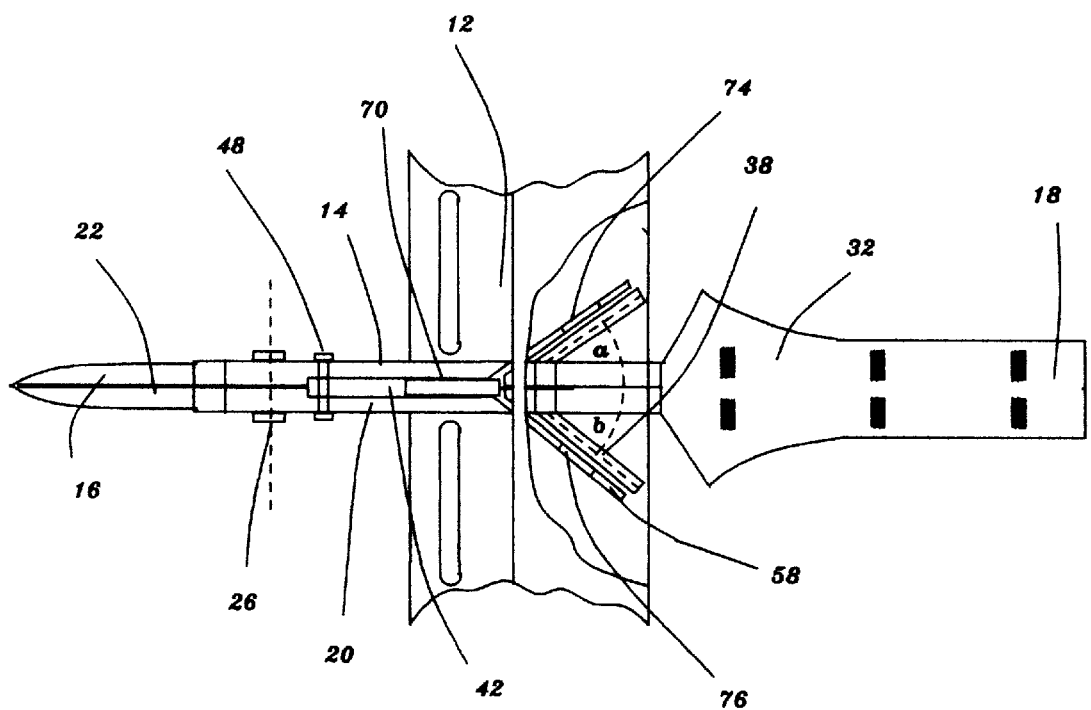
FIG. 3 is a view taken on the line 3—3 of FIG. 1.

Furthermore, as shown in phantom outline in FIG. 1, the knife 40 has a greater height than the corresponding knife located behind the knife 40 as shown in FIG. 3.

Figure 2:
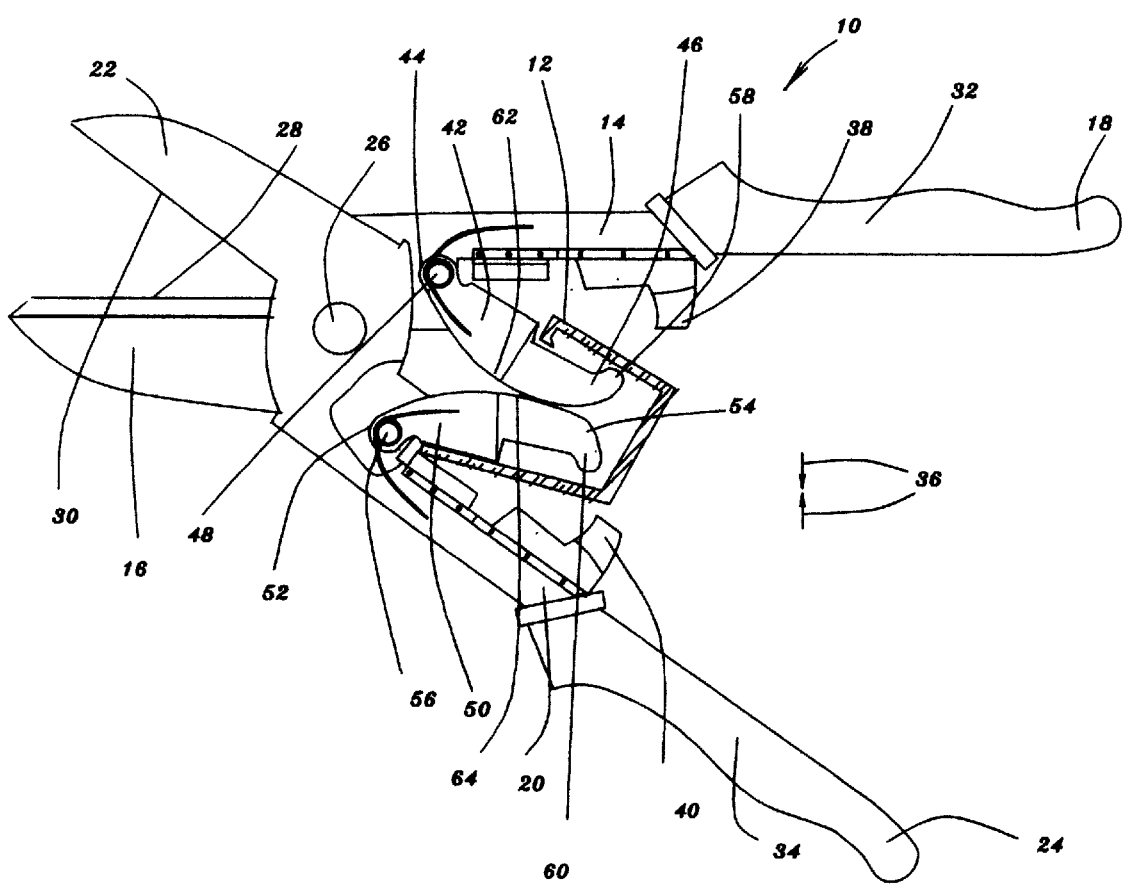
FIG. 2 is a similar view to that shown in FIG. 1 but shows the device in an open position thereof.

FIG. 2 is a similar view to that shown in FIG. 1 but shows the first member 14 pivoted about axis 26 away from the second member 20. As shown in FIG. 2, the J-channel 12 is located with the first and second hooks 58 and 60 within the J-channel 12 and as the hand grip 32 and finger grip 34 are urged towards each other, the hooks 58 and 60 support the J-channel 12 as the cutting knife 40 and the cutting blade 38 slice through the J-channel. More specifically, the first arm 42 interacts with the second arm 50 as the grips 32 and 34 move towards each other, the arms 42 and 50 pivoting about axes 48 and 56. The arm 42 defines a curved cam surface 62 which interacts with a further cam surface 64 defined by the second arm 50 as shown in FIG. 2.

FIG. 3 is a sectional view taken on the line 3—3 of FIG. 1. As shown in FIG. 3, the cutting blade 38 is of V-shaped configuration and the cutting knife 40 is also of a similar V-shaped configuration so that as the blade 38 and knife 40 move towards each other, the blade 38 and knife 40 cooperate with each other and are aligned relative to each other for cutting through the J-channel to form a V-shaped cut therein as shown in FIG. 3.

As shown in FIG. 3, 42 pivots about axis 48 and is of Y-shaped configuration so that the distal end 46 of the arm 42 has a first and a second prong 74 and 76 respectively. As shown in FIG. 3, the prong 76 defines the hook 58. The prongs 74 and 76 define angles a and b respectively with the members 14 and 20. The angles a and b are preferably 45 and 44 degrees respectively. As shown, the cutting blade 38 is also of Y-shaped configuration so that as the J-channel is cut, the arms support the J-channel internally. The an 50 is of similar configuration to the arm 42 and the knife 40 is of corresponding shape to the blade 38. However, as shown in phantom outline, one of the portions of the knife is of a lesser height as shown in FIGS. 1 and 2.

The present invention provides a unique snipper tool device which not only provides shearing and cutting edges 28 and 30 for cutting J-channel and the like, but also includes a cutting blade 38 and cooperating cutting knife 40 for accurately providing a V-shaped cut through the J-channel while providing support for such J-channel during the process of cutting the V-shaped cut.

Also, the tool device avoids the requirement of providing additional tools to carry out a cutting and snipping operation as all the cutting and snipping can be performed using the tool of the present invention.

What is claimed is:

1. A snipper tool device for snipping J-channel, said device comprising:

a first member having a first and a second end;

a second member having a first and a second extremity;

said first and second members being pivotally secured to each other about a first axis disposed between said ends of said first member and between said extremities of said second member;

said first end of said first member defining a shearing edge;

said first extremity of said second member defining a cutting edge, said shearing and cutting edges cooperating together for snipping the J-channel;

said second end of said first member defining a hand grip;

said second extremity of said second member defining a finger grip, said hand grip and said finger grip being arranged such that when said hand grip and said finger grip move towards each other, said shearing edge and said cutting edge move towards each other for snipping the J-channel;

a cutting blade rigidly secured to said first member between said first axis and said hand grip;

a cutting knife rigidly secured to said second member between said first axis and said finger grip, said cutting blade and said cutting knife moving towards each other when said hand grip and said finger grip move towards each other such that said cutting blade and said cutting knife perform a cutting operation on the J-channel when the J-channel is disposed between said members between said first axis and said grips;

a first arm having a proximal and a distal end, said proximal end being pivotally secured to said first member about a second axis disposed between said first axis and said grips;

a second arm having an inner and an outer end, said inner end being pivotally secured to said second member about a third axis disposed between said first axis and said grips, said axes being disposed parallel relative to each other;

said distal end of said first arm defining a first hook for internally engaging the J-channel; and said outer end of said second arm defining a second hook for internally engaging the J-channel, the arrangement being such that when the J-channel is located between said members and between said first axis and said grips, said hooks engage the J-channel for supporting the same and for urging the J-channel towards said cutting blade and said cutting knife for performing said cutting operation on the J-channel when said grips are urged towards each other.

2. A snipper tool device as set forth in claim 1 wherein said first and second members are fabricated from steel.

3. A snipper tool device as set forth in claim 1 wherein said hand grip and said finger grip are fabricated from plastics material.

4. A snipper tool device as set forth in claim 1 wherein said first arm defines a cam surface;

said second arm defines a further cam surface, said cam surfaces interacting with each other for internally supporting the J-channel.

5. A snipper tool device as set forth in claim 4 wherein said cam surfaces interact so that when said arms pivot about said second and third axes, said hooks are disposed within the J-channel such that said hooks support the J-channel and said hooks move away from each other during cutting movement of said cutting blade and cutting knife through the J-channel.

6. A snipper tool device as set forth in claim 1 wherein said cutting knife is of V-shaped configuration.

7. A snipper tool device as set forth in claim 1 wherein said cutting blade is of V-shaped configuration so that said blade and knife cooperate with each other for cutting a V-shaped cut through the J-channel.

8. A snipper tool device for snipping J-channel, said device comprising:

a first member having a first and a second end;

a second member having a first and a second extremity;

said first and second members being pivotally secured to each other about a first axis disposed between said ends of said first member and between said extremities of said second member;

said first end of said first member defining a shearing edge;

said first extremity of said second member defining a cutting edge, said shearing and cutting edges cooperating together for snipping the J-channel;

said second end of said first member defining a hand grip;

said second extremity of said second member defining a finger grip, said hand grip and said finger grip being arranged such that when said hand grip and said finger grip move towards each other, said shearing edge and said cutting edge move towards each other for snipping the J-channel;

a cutting blade rigidly secured to said first member between said first axis and said hand grip;

a cutting knife rigidly secured to said second member between said first axis and said finger grip, said cutting blade and said cutting knife moving towards each other when said hand grip and said finger grip move towards each other such that said cutting blade and said cutting knife perform a cutting operation on the J-channel when the J-channel is disposed between said members between said first axis and said grips;

a first arm having a proximal and a distal end, said proximal end being pivotally secured to said first member about a second axis disposed between said first axis and said grips;

a second arm having an inner and an outer end, said inner end being pivotally secured to said second member about a third axis disposed between said first axis and said grips, said axes being disposed parallel relative to each other;

said distal end of said first arm defining a first hook for internally engaging the J-channel;

said outer end of said second arm defining a second hook for internally engaging the J-channel, the arrangement being such that when the J-channel is located between said members and between said first axis and said grips, said hooks engage the J-channel for supporting the same and for urging the J-channel towards said cutting blade and said cutting knife for performing said cutting operation on the J-channel when said grips are urged towards each other;

said first arm defining a cam surface; and said second arm defining a further cam surface, said cam surfaces interacting for supporting the J-channel internally.

9. A snipper tool device for snipping J-channel, said device comprising:

a first member having a first and a second end;

a second member having a first and a second extremity;

said first and second members being pivotally secured to each other about a first axis disposed between said ends of said first member and between said extremities of said second member;

said first end of said first member defining a shearing edge;

said first extremity of said second member defining a cutting edge, said shearing and cutting edges cooperating together for snipping the J-channel;

said second end of said first member defining a hand grip;

said second extremity of said second member defining a finger grip, said hand grip and said finger grip being arranged such that when said hand grip and said finger grip move towards each other, said shearing edge and said cutting edge move towards each other for snipping the J-channel;

a cutting blade rigidly secured to said first member between said first axis and said hand grip;

a cutting knife rigidly secured to said second member between said first axis and said finger grip, said cutting blade and said cutting knife moving towards each other when said hand grip and said finger grip move towards each other such that said cutting blade and said cutting knife perform a cutting operation on the J-channel when the J-channel is disposed between said members between said first axis and said grips;

a first arm having a proximal and a distal end, said proximal end being pivotally secured to said first member about a second axis disposed between said first axis and said grips;

a second arm having an inner and an outer end, said inner end being pivotally secured to said second member about a third axis disposed between said first axis and said grips, said axes being disposed parallel relative to each other;

said distal end of said first arm defining a first hook for internally engaging the J-channel;

said outer end of said second arm defining a second hook for internally engaging the J-channel, the arrangement being such that when the J-channel is located between said members and between said first axis and said grips, said hooks engage the J-channel for supporting the same and for urging the J-channel towards said cutting blade and said cutting knife for performing said cutting operation on the J-channel when said grips are urged towards each other;

said first arm defining a cam surface;

said second arm defining a further cam surface, said cam surfaces interacting for supporting the J-channel internally;

said cutting knife being of V-shaped configuration; and said cutting blade being of V-shaped configuration so that said blade and knife cooperate with each other for cutting a V-shaped cut through the J-channel.

* * * * *